Jan. 27, 1970    L. LEVITOV ET AL    3,491,722
INTRODUCTION TANK FOR AQUARIUMS
Filed April 28, 1967

INVENTORS:
Leo Levitov &
Joseph P. Young
ATTORNEY.

United States Patent Office 3,491,722
Patented Jan. 27, 1970

3,491,722
INTRODUCTION TANK FOR AQUARIUMS
Leo Levitov, Jersey City, and Joseph P. Young, Roselle Park, N.J., assignors to Tropical Fish Patterns, Inc., Jersey City, N.J., a corporation of New Jersey
Filed Apr. 28, 1967, Ser. No. 634,514
Int. Cl. A01k 64/00
U.S. Cl. 119—3          4 Claims

ABSTRACT OF THE DISCLOSURE

An introduction tank of transparent glass or plastic is provided which is immersed in an aquarium, to which it is secured, and receives new fish with their transport water which are ultimately to be added to the aquarium. Provision is made for a regular flow of aquarium water into the tank, as by way of an inlet port in a wall or corner of the tank, such port being valve-controlled, so that the transport water is gradually diluted with aquarium water until the composition and temperature of the tank water are nearly those of the aquarium water. Thereby shock to the fish on being transferred to the aquarium is minimized, while at the same time the aquarium fish become accustomed to the presence of the newcomers. The introduction tank can also be formed by partitioning off a part of the aquarium by means of a transparent plate sealed against two of the aquarium side walls and the bottom wall, and provided with means for regulating the flow of aquarium water into the empty isolated space.

---

The present invention relates to an introduction tank for preparing newly obtained fish and other aquarium animals for introduction into an aquarium.

It is well known among dealers and fanciers of fishes of marine or fresh water origin that frequently the shock of being transferred into a private or public aquarium can be injurious to the fish and often cause their death. Among the reasons for such dangers are the different compositions and temperatures of the water in which the fish have been transported and of the water in the aquarium into which they are introduced.

It is also known that the inhabitants of aquariums will frequently attack newcovers, and it has been the practice to insert a sheet of glass in the aquarium to reserve a section of the aquarium for the newcomers, or to place them in a wire net structure immersed in the aquarium until the original population has become accustomed to their presence. However, such resorts do not protect the new fish against the hazards arising from different water compositions and different temperatures.

It is also frequently desirable to isolate the newcomers for a period of time in order to make sure that they are not subject to any diseases, such as the disease known as "Ick" in the case of marine fish.

It is an object of the invention to provide fish aquariums with an isolated space in full view of the fish occupying the aquarium, but to which such fish do not have access, and to provide means for feeding regulated amounts of aquarium water, and at predetermined rates, into such space, such isolated space to be suitable for use for various purposes, and particularly for the gradual acclimating of new fish arrivals to the conditions in the aquarium and for the individual treatment of diseased fish with chemicals or drugs, without at the same time subjecting the fish in the aquarium to such treatment.

It is a further object of the invention to provide an isolated space within the aquarium in full view of the fish in the latter, so that such fish can become accustomed to the presence of new arrivals and hence will not be inclined to attack such new arrivals which would be the case if the latter were immediately introduced into the aquarium.

More specifically, it is an object of the invention to provide a transparent introduction tank which is immersed to a greater or less extent in the aquarium and which receives the newly obtained fish together with the water in which they have been shipped, and to provide means whereby such water can be gradually diluted with water from the aquarium, so that the new arrivals become accustomed to the composition and temperature of the aquarium water.

A further object of the invention is to provide an introduction tank which is designed to be immersed in an aquarium to a sufficient degree such that a controlled port provided in a wall of the tank will allow a regulated flow of water from the aquarium into the introduction tank to the end that the water in the latter gradually approach the composition of the aquarium water, the degree of dilution of the original water in which the fish were transported being controlled by the depth to which the introduction tank is immersed.

It is a further object of the invention to provide a simple and inexpensive means whereby the introduction tank can be secured to a wall of the aquarium and further means whereby it may be held fixedly at various degrees of immersion in the aquarium.

Other objects and advantages of the invention will appear from the following more detailed description thereof.

In accordance with the present invention, an isolated space in the aquarium is provided, either by means of a wall forming a permanent part of the aquarium or removably sealed in adjacent or opposite walls of the aquarium and in the bottom wall thereof; or, preferably, in the form of a separate tank having side walls and a bottom wall sealed to each other, or manufactured integral with each other, and adapted to be immersed to various depths within an aquarium and secured to one or two walls thereof, the structure being characterized by the provision of a passageway or port connecting the interior of the aquarium with the interior of the isolated space or of the tank, such port or passageway being controlled at will by means of a valve of any suitable type. Hence, the transport water in which the new fish were carried can be placed in the isolated section of the aquarium, or in the introduction tank, and the rate of change of its composition to nearly that of the water in the aquarium can be controlled to minimize the shock usually suffered by new fish when introduced into an aquarium whose water composition, whether fresh or marine, differs from that to which the fish had been accustomed.

In the at present preferred form of the invention, there is provided an introduction tank of square or oblong horizontal cross-section and having side walls and a bottom wall, the tank being provided with a collar externally thereof and vertically slidable along the side walls thereof, means being provided to fix the collar in selected position on the tank, and also to an aquarium wall, or to adjacent walls at a corner of the aquarium, a passageway for water from the aquarium into the tank being controlled by suitable valve means to regulate the rate of flow of aquarium water into the tank.

In a simplified form of the invention, the slidable collar is omitted and the tank is clamped at a more or less fixed depth of immersion to a wall or adjacent walls of the aquarium.

In the accompanying drawing,

FIG. 1 is a top plan view of our introduction tank with the aquarium shown only fragmentarily;

FIG. 2 is a vertical section taken along the line 2—2 of FIG. 1;

FIG. 3 is a fragmentary perspective view of a modification; while

FIG. 4 is a top plan view of a further modification.

Figures 1, 2, 3, 4:
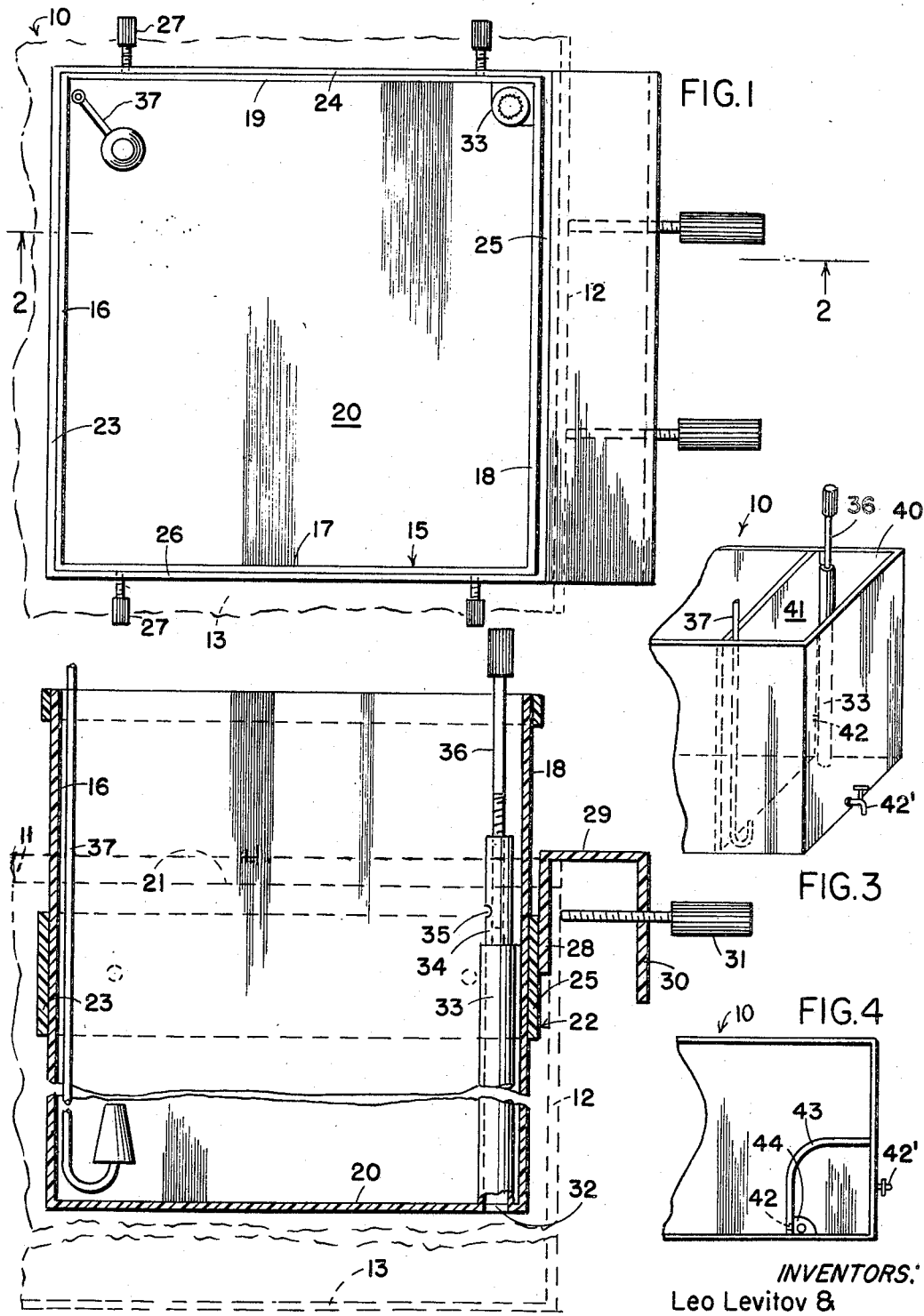

Referring to the drawing, the aquarium is shown fragmentarily at 10 with side walls 11, 12 and bottom wall 13, and is provided with the usual aerator in the form of a tube (not shown) extending to or nearly to the bottom of the aquarium and connected with an air compressor or similar device to supply the water with a continuous stream of air.

Shown generally at 15 is an introduction tank constructed in accordance with the invention. The tank is composed of the side walls 16, 17, 18 and 19, and the bottom wall 20, and is adapted to be immersed in the aquarium to various selected depths below the water level 21 in the aquarium. To overcome the buoyancy effect of the water in the aquarium on the empty tank, means are provided to secure the tank to the aquarium. In the form of the invention illustrated in FIGS. 1 and 2, the tank is provided with a collar shown generally at 22 and composed of the parts 23, 24, 25 and 26, sealed to or formed integrally with each other.

The collar 22 fits snugly about the tank and is vertically slidable thereon. It is fixed in a selected position by means of clamping screws 27 which pass through threaded holes in the parts 24 and 26, and also if desired, in part 23 of the collar.

The means for affixing the tank to an aquarium wall, or to two meeting walls at a corner of the aquarium, comprises a plate 28 cemented or otherwise secured to the part 25 of the collar, as shown in FIG. 2. The plate 28 has a horizontal extension 29 from which depends a plate 30, the parts 28, 29 and 30 forming a channel structure which may be of integral form and may be integral also with the part 25; the plate 28 can form a vertical extension of such part 25.

The horizontal plate 29 is adapted to rest upon the top edge of the aquarium wall 12, and to overcome the buoyancy action of the water when the tank is empty, means are provided to secure the collar 22 and hence also the tank by means of clamping screws 31 having threaded stems which pass through threaded openings in the vertical plate 30.

Various means may be resorted to for providing a controlled flow of aquarium water into the tank 15. In the form of the invention illustrated in FIGS. 1 and 2, the bottom wall 20 of the tank is provided with an opening 32 from which there extends a tube 33 inside the tank. The tube 33 communicates with a hollow threaded extension 34 which has a lateral opening 35 leading into the interior of the tank. The flow of aquarium water through opening 32, tube 33 and extension 34 is controlled by a needle valve 36 which exposes the opening 35 to a greater or less extent to determine the time period during which the water in the tank 20 reaches the level of the water in the aquarium, and hence the rate at which the composition and temperature of the water in the tank (it being assumed that the newcomer fish and their transport water have been placed in the tank) reaches or substantially reaches those of the aquarium water. The tube 33 and extension 34 are cemented to the walls 18 and 19 at their meeting corner. The parts 33 and 34 can be replaced by a fillet at such corner which is bored to provide the opening 32 and passageway leading to the part 35, the upper portion of the fillet being drilled and threaded in the manner illustrated in FIG. 2. It will be apparent that the tube 33 and extension 34 can be located intermediate the ends of a wall or can be formed in an enlargement of a wall intermediate its ends.

As stated above, a simplified structure can be provided by omitting the collar 22, in which case the plate 28 can be cemented or otherwise secured to the wall 18 of the tank. In a further simplification, the channel 28, 29, 30 can also be omitted and the upper edge of the wall 18 held more or less level with the upper edge of the wall 12 of the aquarium and the walls secured to each other by C-clamps. By employing clamps of elongated jaws, a certain range of vertical adjustment of the tank 20 can be obtained. Similarly, if the channel 28, 29, 30 is retained, but without the adjustable collar 22, then by lengthening the vertical plate 30 and providing the threaded holes for the screws 31 near the bottom edge of the plate, the depth to which the tank can be immersed can be varied over a considerable vertical distance.

It will be apparent from the foregoing that in use, the tank 20 is secured to the aquarium walls after being immersed to a depth such that the desired amount of water will be fed from the aquarium into the tank to mix with and dilute the transport water which has been placed with the newcomer fish in the tank 20. By adjusting the needle valve 36, the rate at which the temperature and composition of the water in the tank will change can be controlled. It will be understood that except for the part 35 and the opening 32, the tank walls are imperforate. The tank is preferably made of water white clear material, such as glass or water insoluble plastic.

It will be further understood that the tank will be supplied with branch tube 37 leading from the main air supply tube of the aquarium.

In place of the needle valve 36, there can be employed a hollow tubular member whose interior communicates with the interior tube 33 and whose wall is provided with an opening which can be brought into overlapping relation with the port 35 to different degrees to control the flow of water through such port. If desired, opening 32 and parts 33, 34, and 36 can be replaced by a siphon provided with an adjustable clamp in one of the tube sections thereof, or by an adjustable valve in the bulb section thereof, to regulate the flow of water from the aquarium into the tank.

In FIG. 3 there is shown an aquarium 10, of which a portion 40 has been isolated by means of a transparent plate 41 which is sealed to the side and bottom walls of the aquarium or is integral therewith. Before use, any water in the isolated space 40 is drained off by means of the drain cock 42′, the port controlled by the needle or rotary valve 36 being then closed. After placing the new fish with their transport water in the space 40, the valve 36 is operated to allow aquarium water to enter through opening 42 in the plate 41 and leading into the interior of the tubular member 33. After the fish have remained in the partitioned off space 40 for a suitable length of time, they are transported to the main portion of the aquarium.

FIG. 4 shows an arrangement in which the partitioning wall 43 of clear glass or plastic material isolates only a corner portion of the aquarium, but the mode of use is similar to that of FIG. 3. FIG. 4 shows a fillet 44 which is bored and drilled as indicated above to provide the controlled passageway for the aquarium water in place of the cemented tube arrangement. It will be understood that in both the FIG. 3 and FIG. 4 tank arrangements, there can be employed a valved siphon for feeding aquarium water at a pre-determined rate into the separate tank structures formed by the walls 41 and 43.

We claim:

1. An introduction tank for aquariums comprising imperforate side and bottom walls and adapted to be immersed in an aquarium and secured to a side wall thereof with its bottom wall below the normal water level in the aquarium, but with its side wall top edges above such water level, means for providing a selected rate of flow of aquarium water into said tank when the water level in the latter is below that in the aquarium to effect gradual dilution of water in the tank with water from the aquarium, said tank having a collar slidable vertically along the side walls of the tank, means attached to the collar for suspending the tank from a side wall of an aquarium, and means for fixing the collar at a selected position on the tank to predetermine the depth of immersion of the tank in the aquarium.

2. An introduction tank for aquariums comprising imperforate side and bottom walls and adapted to be immersed in an aquarium and secured to a side wall thereof with its bottom wall below the normal water level in the aquarium, but with its side wall top edges above such water level, means for providing a selected rate of flow of aquarium water into said tank when the water level in the latter is below that in the aquarium to effect gradual dilution of water in the tank with water from the aquarium, the tank including a hollow member at one corner of the tank providing a vertically extending passageway from the bottom of said member to a point intermediate the ends thereof, said member having also a lateral passageway connecting the vertical passageway with the interior of the tank, the vertically extending passageway being in permanent communication with the water in an aquarium when the tank is mounted therein, and a valve controlling the flow of water through the lateral passageway, whereby the rate at which the original water in the tank is diluted with the water of the aquarium can be controlled.

3. An introduction tank for aquariums comprising imperforate side and bottom walls and adapted to be immersed in an aquarium and secured to a side wall thereof with its bottom wall below the normal water level in the aquarium, but with its side wall top edges above such water level, whereby the tank may be immersed in the aquarium and secured to such side wall with a body of water therein whose surface is below the water surface in the aquarium, the side and bottom walls of the tank being devoid of any passageway for the free flow of water from the aquarium into the tank as the tank is lowered into the aquarium, and means for providing a controlled rate of flow of aquarium water into said tank when the water level in the latter is below that in the aquarium to effect gradual dilution of water in the tank with water from the aquarium.

4. An introduction tank according to claim 3, wherein said means comprises a port in a wall of the introduction tank disposed below the level of the water in the aquarium when the tank is positioned therein and affording access for water from the aquarium into the tank, and a valve for regulating the flow of water through said port.

References Cited
UNITED STATES PATENTS

| | | | |
|---|---|---|---|
| 622,581 | 4/1899 | Workman | 119—5 |
| 1,838,215 | 12/1931 | De Clairmont | 119—5 |
| 2,785,831 | 3/1957 | Smolin. | |
| 3,140,691 | 7/1964 | Stark | 119—5 |
| 3,216,395 | 11/1965 | Girard | 119—5 |
| 3,291,098 | 12/1966 | Halpert | 119—5 |

HUGH R. CHAMBLEE, Primary Examiner

U.S. Cl. X.R.

119—5